April 21, 1970   W. O. WELLS   3,507,382
SEMICONDUCTOR SLICE STORAGE AND CONVEYOR SYSTEM
Filed March 8, 1968   2 Sheets-Sheet 1

WALLACE O. WELLS
INVENTOR.

BY

ATTORNEY

United States Patent Office 3,507,382
Patented Apr. 21, 1970

---

3,507,382
SEMICONDUCTOR SLICE STORAGE AND CONVEYOR SYSTEM
Wallace O. Wells, Garland, Tex., assignor to Texas Instruments Incorporated, Dallas, Tex., a corporation of Delaware
Filed Mar. 8, 1968, Ser. No. 711,589
Int. Cl. B65g *33/02*
U.S. Cl. 198—213                                                    1 Claim

ABSTRACT OF THE DISCLOSURE

Disclosed is a screw system for handling semiconductor slices that utilizes three or more lead screws in a parallel spaced arrangement. Semiconductor slices are introduced at one end of the lead screws and held in place by the corresponding threads of each lead screw. The lead screws are synchronized such that the introduction and retrieval of the individual slices to and from the system is accomplished by rotating the lead screws in unison. The screw system may be incorporated into a conveyor furnace or a storage magazine for semiconductor slices.

---

Figure 1:
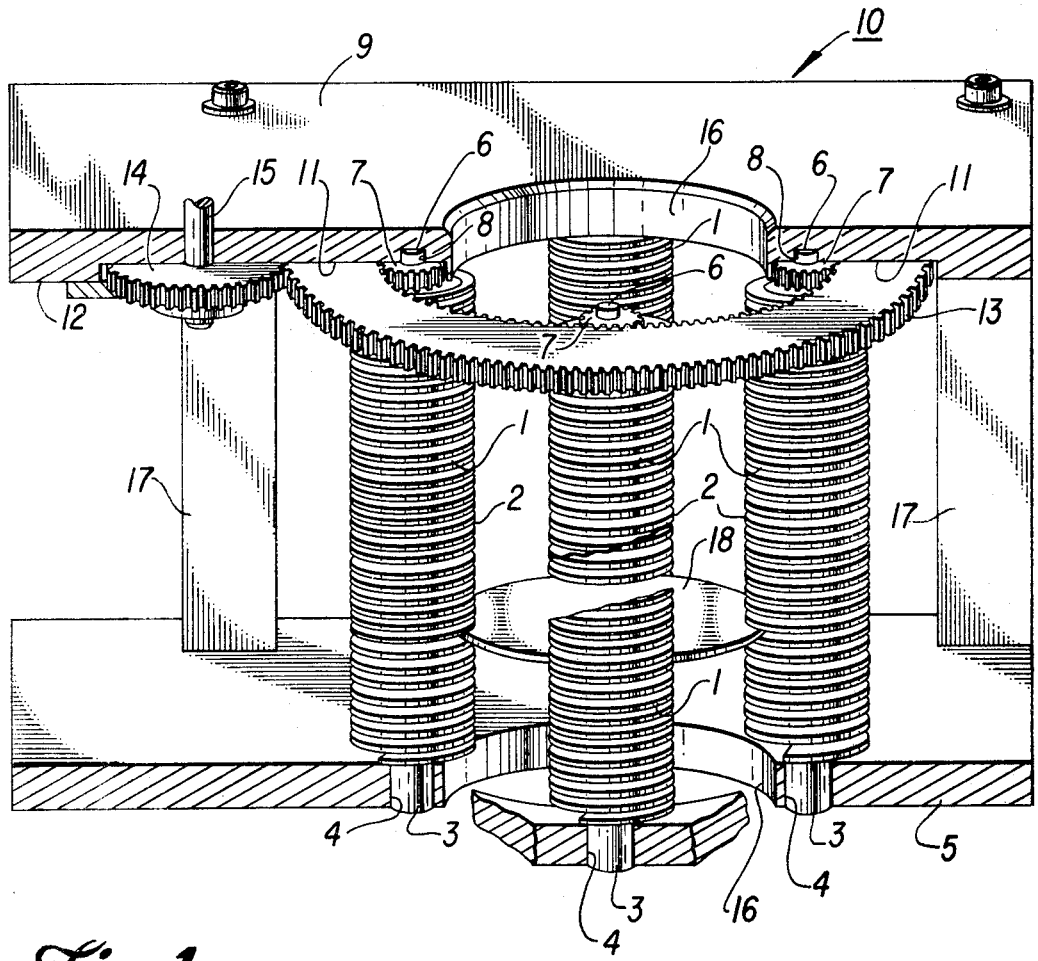

This invention relates to storage and conveying systems and more particularly to such systems for the storage and conveyance of semiconductor slices.

There is a continuing need in the semiconductor industry for better methods and apparatus for handling, conveying and storing semiconductor slices. During the manufacture of semiconductor devices, slices of semiconductor material such as germanium or silicon are formed from large crystals of these materials. The slices are extremely thin and fragile, each slice being in the order of approximately an inch to two and one half inches in diameter and approximately 40 mils in thickness. In addition to being very thin and easily broken, each semiconductor slice must be carefully handled to insure that all but the edges of the major surfaces of the slices remain undamaged during device fabrication. The slice surfaces must also remain clean and highly polished throughout the fabrication of the individual devices. One of the common methods of handling the slices is to use tweezers which grip the edges of a slice, frequently resulting in a broken slice; another method is to use vacuum pencils or other vacuum devices which must contact the working portion of the slice surface, causing surface damage.

For storage purposes, the slices are usualy laid one on top of the other in a glass container with a separating layer of material, such as a lint free paper, between the slices. This method of storage is cumbersome, involving slow storage and retrieval times which necessitates the harmful repetition of the handling methods previously described if many operations are to be performed on the slices with a need for storage between operations. The possibility of slice damage resulting from the cracking of the slice or the scratching of the slice surface thus becomes greater as the number of required handling operations increases.

At the present time, depositions on and diffusions into semiconductor slices are made by placing the slices, by hand, on edge in quartz boats of limited capacity, which, in turn, are placed in a furnace where the slices undergo time, temperature and atmospheric cycling. By this batch method, it is virtually impossible for two or more successive batches of slices to undergo identical cycling. If the furnace does not have completely uniform conditions, even slices in the same batch will not be identically affected.

Therefore, an object of the invention is a storage and conveyor system for semiconductor slices that is capable of handling each individual slice at its edge with the remainder of the slice left untouched.

Another object of the invention is a storage and conveyor system for semiconductor slices whereby individual slices can be introduced into and retrieved from the system by mechanical means at a faster rate than with commonly used manual methods.

Still another object of the invention is a storage and conveyor system for semiconductor slices which includes a diffusion furnace that conveys closely packed slices through the furnace in a direction perpendicular to their major faces without any contact being made to the slices except on their edges.

Figure 2:
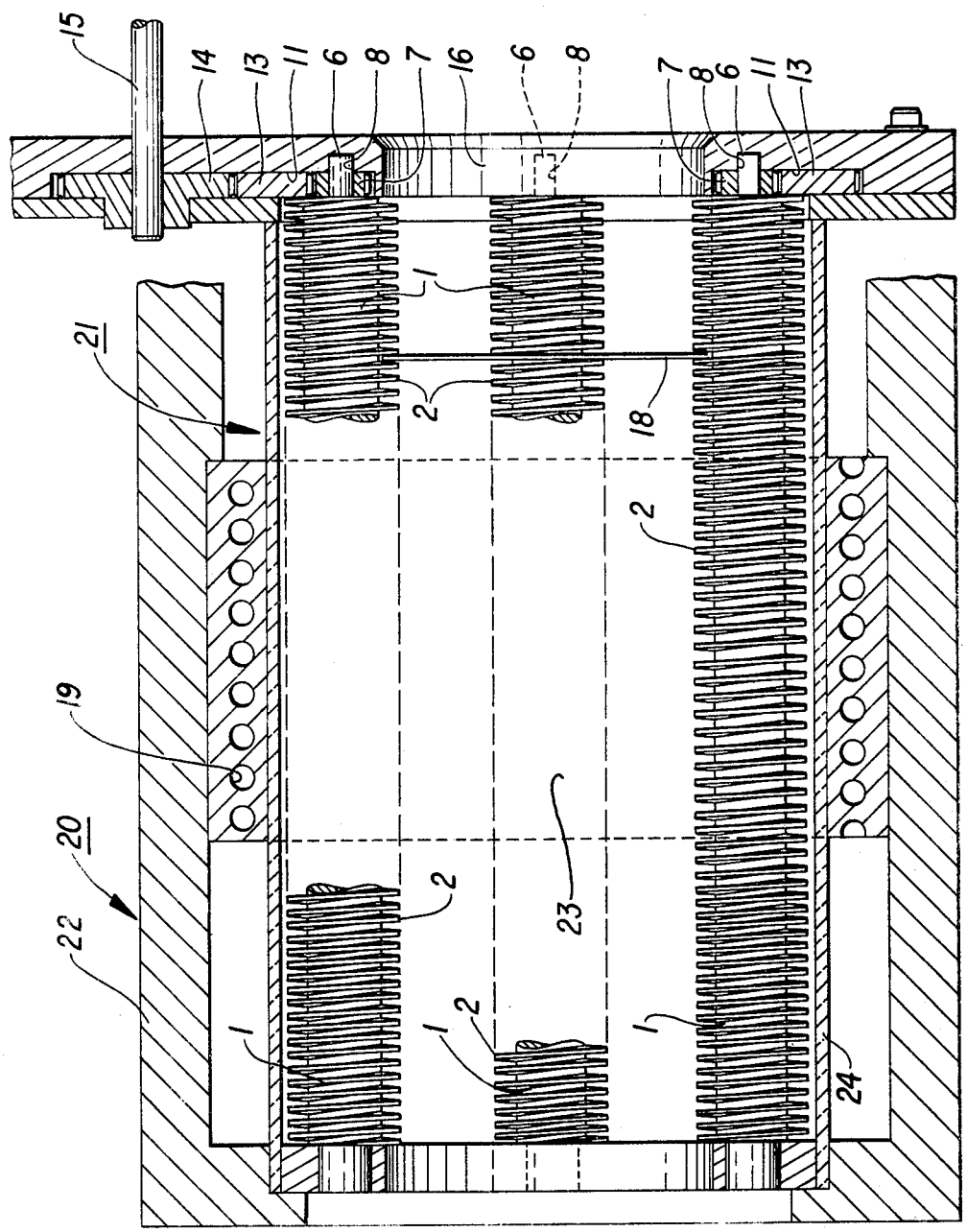

The novel features believed to be characteristic of the invention are set forth with particularity in the appended claim. The invention itself, however, as well as further objects and advantages thereof may be best understood by reference to the following detailed description when read in conjunction with the accompanying drawings wherein:

FIGURE 1 is a pictorial view, partially in section, illustrating the storage and conveyor system according to the invention, FIGURE 2 is a side view, partially in section, illustrating the storage and conveyor system involving the use of a diffusion furnace according to the invention.

In brief, the invention involves the use of three or more lead screws of a uniform size mounted perpendicularly between two end plates. Each end plate has an opening centered between the lead screws, the opening being of such size as to allow the insertion and retrieval of semiconductor slices. The lead screws are located parallel to one another and spaced on a bolt circle of sufficient diameter so as to allow a round slice to contact each screw at a point approximately on its pitch diameter. The teeth of a small diameter pinion gear on one end of each lead screw meshes with the teeth on the inner diameter of a ring gear which circumscribes each pinion gear. The lead screws are synchronized with one another so that corresponding thread roots are in a plane perpendicular to the lead screw axis and substantially parallel to the end plates. Power is transmitted to the lead screws through the ring gear which also has teeth on its outer diameter that mesh with the teeth of a driving gear mounted on the power input shaft. The pitch of the lead screw teeth is such that the semiconductor slices are retained between the corresponding thread roots, thus allowing the slices to move freely and parallel to the screw axis without touching one another. The slices can be moved in any direction so that the system will operate in any position in space.

When used in conjunction with a furnace, the system conveys slices through the furnace at a uniform rate such that each slice is similarly affected by the same furnace conditions. Due to the close packing density of the slices, the diffusion furnace can be much smaller than conventional diffusion furnaces currently used in the industry.

Referring now to the figures of the drawings, FIGURE 1 illustrates a typical embodiment 10 of the storage and conveyor system of the invention. When the system 10 is to be used in a vertical position four substantially identical lead screws 1 must be used. The lead screws 1 are spaced between two end plates 5 and 9 in a parallel relationship to one another on a bolt circle of sufficient diameter so that a round slice 18 of a desired size contacts each lead screw 1 at a point approximately on the respective pitch diameter of each lead screw.

Each lead screw 1 has a projecting journal 3 that fits rotatively within an opening 4 or a bearing, if preferred, in the end plate 5, which end plate 5 is positioned in a perpendicular relationship to the axis of the parallel lead screws 1.

The opposite end of each lead screw 1 also has a projecting journal 6 and pinion gear 7 keyed on the journal. The journal 6 fits rotatively into an opening 8 or a bearing, if preferred, in the opposite end plate 9, which end plate 9 is positioned parallel to the end plate 5. The pinion gear 7 of each lead screw 1 is located against a recessed surface 11 of the end plate 9. A floating gear 13 in the shape of a ring is located against the recess surface 11, also, and has gear teeth on its inside diameter which mesh with the gear teeth of the pinion gear 7 of each lead screw 1. Teeth on the outside diameter of the ring gear 13 mesh with the gear teeth of the power gear 14, which is also located against the recess surface 11. However, all of the gears can be located against the inside surface 12 of the end plate 9 instead of being located in a recess, if desired. The power gear 14 is connected to a shaft 15 that extends through the end plate 9 to connect to a power source (not shown). The power source can be a manual crank or an electric motor, for example. Both the end plate 9 and the end plate 5 contain large enough openings 16 to allow the introduction and retrieval from the storage and conveyor system 10 of semiconductor slices 18. The end plates 5 and 9 are held in a fixed relationship to each other by means such as standoff posts 17, or a cylindrical housing, if preferred.

In actual operation, a semiconductor slice 18, one of many slices, (the number of slices depending upon the number of screw threads) is placed in the system 10 by inserting the slice through the opening 16 in the end plate 9 or 5 and carefully placing it on the endmost thread 2 of each of the four lead screws 1. The lead screws are then rotated in unison one full turn by a controlled power source (not shown) acting through the shaft 15, the power gear 14, the ring gear 13 and the pinion gear 7 of each lead screw. The threads 2 of the lead screws 1 convey the semiconductor slice 18 a distance of one pitch for each full rotation of the screws. This procedure is repeated until the system 10 is completely filled with semiconductor slices. Each slice is held between adjacent threads 2 which contact only the edge of each semiconductor slice, thus eliminating any possibility of slice damage. The system 10 is unloaded by the continued rotation of the lead screws which force the slices from the system through the opening 16 in the end plate 5 or 9. The cylinder formed by the root diameter of the lead screws is greater than the diameter of each slice while the space between adjacent threads is greater than the thickness of each slice to allow free movement of the slices.

The system 10 can be loaded and unloaded from either end and can be powered by any energy source that is desired. In addition to the use of the system for simply storing semiconductor slices, the system can be used as a common carrier for these slices during different operations of device fabrication, such as chemical etching. By fabricating the system from materials that are unaffected by the chemical etches used for device fabrication, the system can be immersed completely in the desired chemical baths, thus eliminating the need for individually handling each semiconductor slice.

One system can also be located to feed a furnace and another system located to load and store the semiconductor slices following their passage through the furnace.

If the system is to be maintained in a horizontal position only, the four lead screws can be replaced by three lead screws, thereby eliminating the top lead screw. The storage magazine then can be loaded and unloaded from the top rather than the ends, if so desired.

In FIGURE 2 is shown the use of a conveyor system 20 utilizing a diffusion furnace 21. The lead screws 1 extend through the furnace 21 and are enclosed by quartz tube 24 to maintain the desired atmosphere for effective diffusion. The lead screws 1 are made from a ceramic or other other heat resistant material to withstand the furnace temperature and atmosphere. The furnace 21 is heated by heating rods or coils 19 and has the outside shell 22, of metal, for example, enclosing the heating coils 19, suitable insulation (not shown) and the quartz tube 24. The shaft 15 is connected to a power source with a specified speed that causes the rotation of the lead screws 1, through the power gear 14, ring gear 13 and pinion gears 7, at such a rate as to provide the semiconductor slice 18 with the desired time within the heater area 23 of the furnace 21 (in actual operation each space between adjacent threads would contain a slice). The conveyor system 20 is loaded and unloaded similarly to the storage and conveyor system 10, as described in conjunction with FIGURE 1.

The system 20 is much shorter than a conventional diffusion furnace due to a much higher slice capacity resulting from the close packing of slices (not shown) such as the semiconductor slice 18. By the use of this system each semiconductor slice 18 receives a more uniform treatment than is available with conventional diffusion furnaces and thus higher yield devices are obtained.

Although preferred embodiments of the invention have been described in detail it is to be understood that various changes, substitutions and alterations can be made therein without departing from the spirit and scope of the invention.

What is claimed is:

1. A storage and conveyor system for semiconductor slices comprising a pair of end plates having openings therein, said openings being of a diameter larger than the diameter of the semiconductor slices, one of said end plates having a recessed portion surrounding the opening therein, at least three lead screws of uniform size mounted perpendicular between said two end plates and surrounding said openings, said lead screws having a pitch such that semiconductor slices are retained between corresponding thread roots permitting the slice to move freely and perpendicular to the end plates without touching each other, a pinion gear connected to an end of each of said lead screws, said pinion gears being located within said recess in said one end plate, a ring gear having teeth on its inner and outer periphery surrounding and meshing with each of said pinion gears located within said recess and a power gear meshing with the outer teeth of said ring gear and a shaft attached to said power gear.

References Cited

UNITED STATES PATENTS 2,479,955   8/1949   Morgan _____ 198—213 XR
2,756,864   7/1956   Laxo _____ 198—213 XR ROBERT G. SHERIDAN, Primary Examiner